Patented Aug. 27, 1946

2,406,458

UNITED STATES PATENT OFFICE 2,406,458

METHOD OF REMOVING RUBBER FROM METAL

Paul G. Gerndt and John A. Hannum, Detroit, Mich., assignors to United States Rubber Company, New York, N. Y., a corporation of New Jersey No Drawing. Application July 15, 1944, Serial No. 545,204

3 Claims. (Cl. 134—42)

This invention relates to a method of removing rubber from metal. More particularly the invention relates to the art of weakening the bond between rubber and metal in composite rubber and metal structures so that the rubber can be readily mechanically separated from the metal.

According to the present invention, the composite rubber and metal structure is subjected to the action of ammonia, monomethylamine, dimethylamine, or monoethylamine for a time and under pressure and temperature conditions such that the bond between the rubber and metal is materially weakened, whereupon the rubber may be separated readily from the metal, as by pulling off by hand or stripping. The composite rubber and metal assembly may be subjected to the ammonia or amine in gaseous form or in aqueous solution. The ammonia or amine readily diffuses through the rubber to the rubber-to-metal bond whether from the gaseous state or from aqueous solution to weaken or destroy the bond. In the case of aqueous solutions, the ammonia is drawn from solution in the water and readily permeates through the rubber to the rubber and metal interface. It has been proposed to weaken the rubber-to-metal bond in composite rubber and metal assemblies by treatment of the composite structure with water or aqueous solutions of fixed alkalis under pressure at elevated temperature and thereafter to mechanically separate the rubber from the metal. The present method has the great advantage over these prior proposals in that water itself or the fixed alkali dissolved in the water will diffuse through the rubber only with great difficulty and then only very slowly, whereas with the much higher permeability of the ammonia and amines through rubber, the ammonia or amine, as in the present case, will diffuse through the rubber very rapidly to attack the rubber-to-metal bond. Further, ammonia, mono- and di-methylamine, and monoethylamine are gases at room temperature and atmospheric pressure and hence will readily diffuse out of the rubber after the treatment to give a rubber that does not contain any foreign materials that would interfere with the reclaiming of the rubber by conventional reclaiming procedures.

The present invention is applicable to cured or uncured natural or synthetic rubber stocks which may be adhered to metals such as brass, bronze, and ferrous metals. The rubber may be bonded to the metal by direct vulcanization of the rubber to the metal, or by the use of an intermediate adhesive, as for example, a rubber isomer cement or a rubber hydrochloride cement. The present invention may be used to strip the rubber from the metal parts of such composite rubber-and-metal assemblies as tank tread links, tank blocks, tank pins, motor mounting parts, and tire bead wires embedded in rubber casings. It may also be used for cleaning molds used in the manufacture of rubber articles where rubber adhered to the molds must be removed.

In treating a structure in which a rubber is adhered to metal with ammonia or an amine according to the present invention, both heat and pressure are desirable but not essential. The higher the concentration of the solution of ammonia or amine where a solution is used, and the higher the temperature and pressure where the ammonia or amine is used in the gaseous state or in aqueous solution, the faster the ammonia or amine will diffuse through the rubber to attack the rubber-to-metal bond. The thicker the rubber portion through which the ammonia or amine must penetrate the longer will be the time necessary to effect the weakening or destruction of the rubber-to-metal bond. It may readily be seen that no ranges of time, temperature or pressure can be given in exact figures for various concentrations of the ammonia or amine or for the various thicknesses of rubber that will be encountered or for all types of rubber-to-metal bond. However, it is a simple matter in any given case to empirically determine the specific conditions which will weaken the bond so as to permit the rubber to be removed from the metal by a mechanical separation.

The preferred material used according to the present invention is ammonia, and for economic reasons, it is desirable to use it in its commercial form as approximately a 30% aqueous solution, which may be diluted to as low as 10% in many cases. With a 20% to 24% aqueous ammonia solution, corresponding to diluting commercial 29.4% aqua ammonia with 20% to 40% water by volume, heating to 300° F. in a closed chamber creates a pressure of 200 to 250 pounds per square inch. The treatment of small parts in an aqueous solution of 10% to 30% by weight of ammonia in a closed container at a temperature from 150° to 325° F. for one-half to five hours is generally satisfactory to sufficiently weaken the rubber-to-metal bond to permit mechanical separation of the rubber from the metal without difficulty.

As a specific illustration, a pressure tank of about 30 inches internal diameter and about 60 inches high is equipped with a removable top cover and steam coils in the bottom of the tank which are also pipes to cold water for cooling purposes. The tank is built to operate up to 300 pounds per square inch pressure. Commercial aqua ammonia (29.4% NH₃) diluted with 40% by volume of water to give an aqueous solution of approximately 20% by weight of ammonia is run into the tank to about the half-way mark. A wire basket containing rubber-and-metal assemblies, in this case small rubber covered metal discs from scrapped motor mountings, was lowered into the container below the level of the ammonia solution. After the cover was securely bolted in place, the ammonia solution was heated by means of the steam coil to about 300° F., creating a pressure of 200 to 250 pounds per square inch. This pressure was maintained for two hours which was sufficient to break the bond between the rubber coatings and the metal discs. At the conclusion of this pressure period, cold water was circulated through the steam coils until the entire apparatus was cold, and the ammonia almost entirely reabsorbed into the solution, preventing waste and minimizing the objectionable smell of ammonia when the cover is removed. The cover was taken off, the basket raised, and the discs removed, whereupon the rubber coatings could be easily stripped by hand from the metal discs.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of removing a rubber from metal in a structure in which the rubber is adhered to metal which comprises subjecting the composite rubber and metal structure to the action of material selected from the group consisting of ammonia, monomethylamine, dimethylamine and monoethylamine, and thereafter mechanically separating the rubber from the metal.

2. The method of removing a rubber from metal in a structure in which the rubber is adhered to metal which comprises subjecting the composite rubber and metal structure to the action of ammonia, and thereafter mechanically separating the rubber from the metal.

3. The method of removing a rubber from metal in a structure in which the rubber is adhered to metal which comprises immersing the composite rubber and metal structure in an aqueous solution of 10% to 30% by weight of ammonia in a closed container at a temperature from 150° to 325° F. for one-half to five hours, and thereafter mechanically separating the rubber from the metal.

PAUL G. GERNDT.
JOHN A. HANNUM.